United States Patent [19]
Mayer

[11] 3,751,644
[45] Aug. 7, 1973

[54] AUTOMATIC BLENDING CONTROL SYSTEM
[75] Inventor: Robert Mayer, Ardmore, Pa.
[73] Assignee: Sun Oil Company of Pennsylvania, Philadelphia, Pa.
[22] Filed: Feb. 22, 1972
[21] Appl. No.: 227,749

[52] U.S. Cl............ 235/151.12, 137/88, 235/92 FL, 235/151.34
[51] Int. Cl.................... G05d 11/02, G06g 7/57
[58] Field of Search.................. 235/151.12, 151.1, 235/150.1, 151.34, 92 CP, 92 PD, 92 FL, 92 CA; 208/DIG. 1; 23/253 A, 254 E, 255 E, 232 E; 137/88, 486, 487.5, 92, 101.19, 100, 624.11, 624.12, 624.21

[56] References Cited
UNITED STATES PATENTS

| | | | |
|---|---|---|---|
| 3,385,680 | 5/1968 | Feld et al............................ | 137/88 X |
| 3,272,217 | 9/1966 | Young............................ | 137/486 X |
| 3,219,046 | 11/1965 | Waugh...................... | 137/101.19 X |
| 3,259,141 | 7/1966 | Brendon..................... | 137/624.11 X |
| 3,342,199 | 9/1967 | McEvoy............................... | 137/88 |
| 3,590,227 | 6/1971 | Porter et al..................... | 235/151.12 |

Primary Examiner—Joseph F. Ruggiero
Attorney—George L. Church, Donald R. Johnson et al.

[57] ABSTRACT

A system for automatically adjusting the percentage or quantity of a given stream (which is being blended with other streams to form a blended product such as gasoline) in accordance with variations in the output of an analyzer associated with that stream. The analyzer measures a particular property of the blended stream. Alarms are activated when the stream or component percentage reaches certain predetermined limits during its automatic adjustment, and the component percentage adjustment is inhibited from going beyond these limits.

8 Claims, 8 Drawing Figures

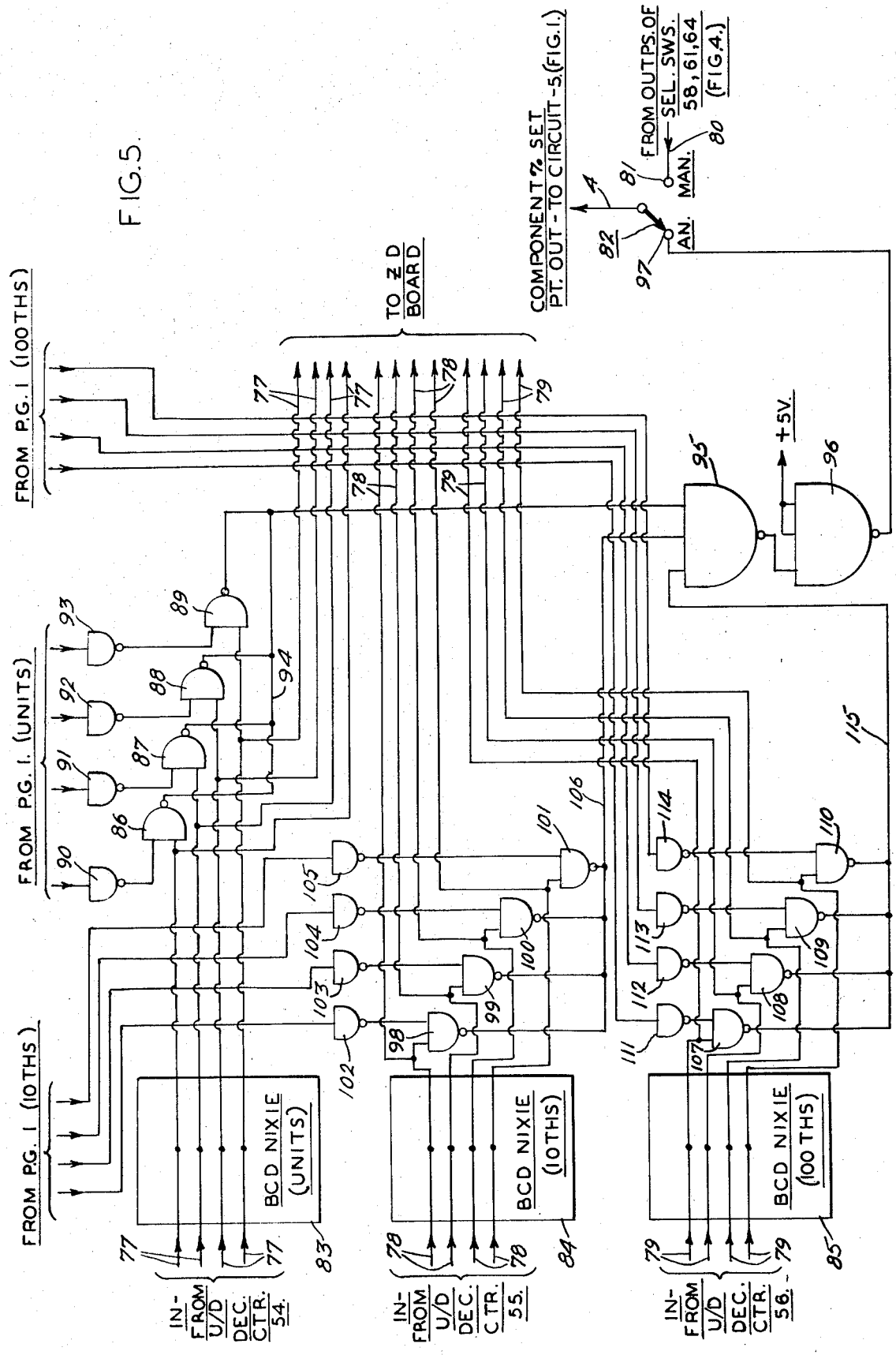

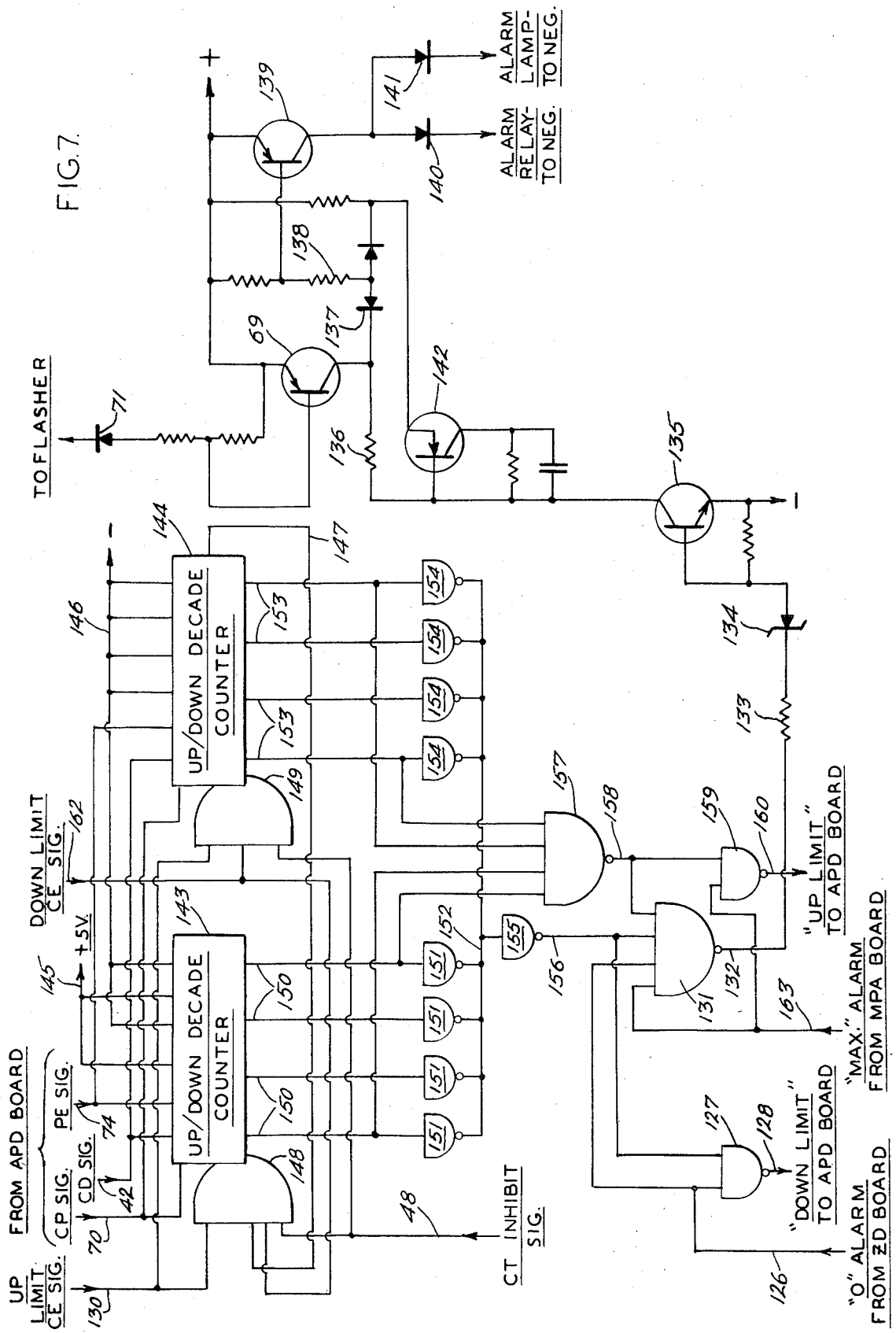

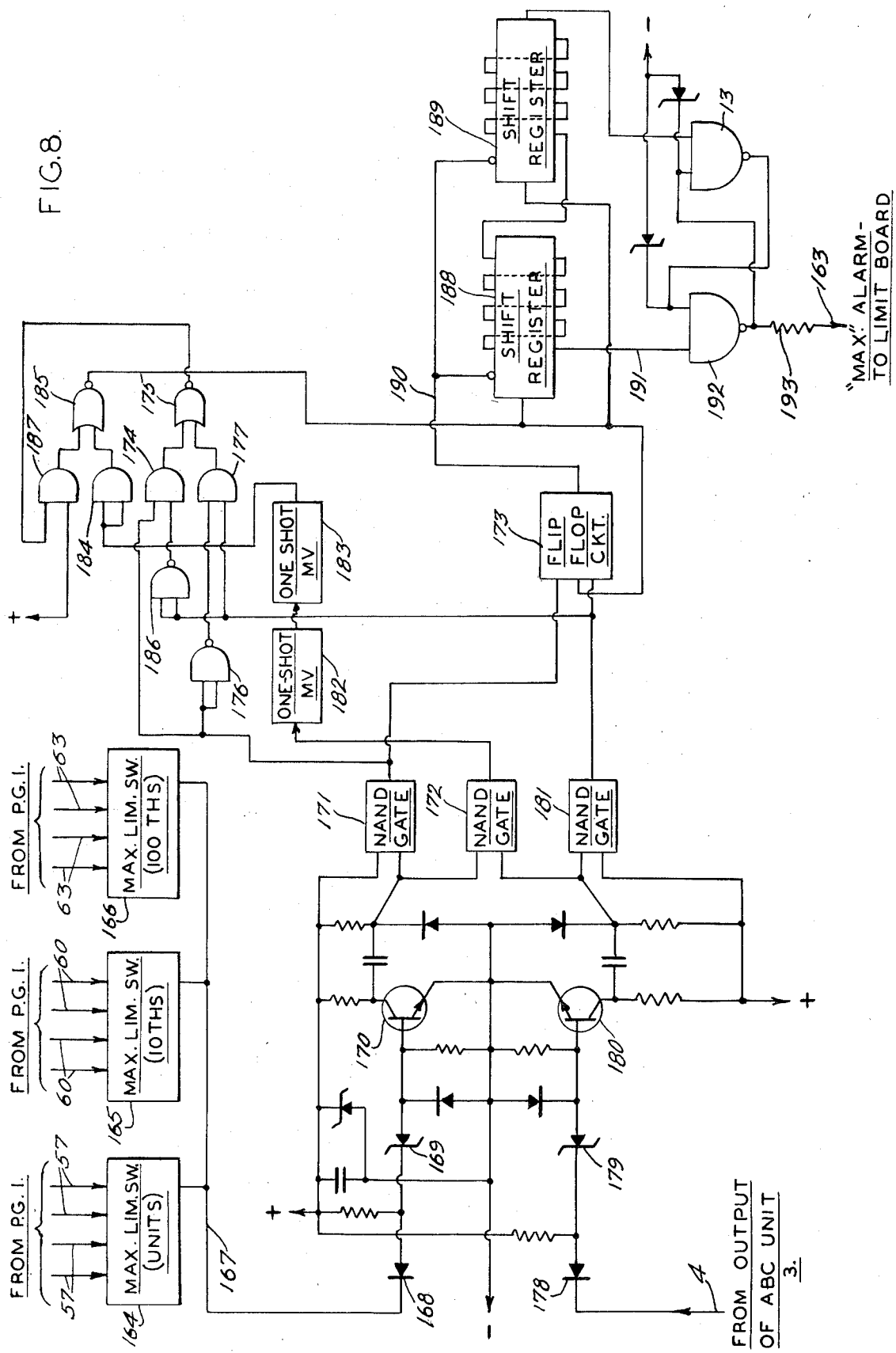

AUTOMATIC BLENDING CONTROL SYSTEM

This invention relates to an automatic control system, and more particularly to a system for automatically adjusting the percentage of a given stream (referred to the total blended stream, of which the given stream forms a blending component) or quantity of a given stream (in the total blended stream), in accordance with variations in the output of an analyzer associated with such given stream.

The invention has particular utility in connection with the automatic blending, in a petroleum refinery, of liquid fuels (gasolines), and it will therefore be described in this environment, by way of example. However, it is also applicable to systems for the blending of other materials.

In the blending of gasolines, two liquid components of the blended stream are of particular interest, and a distinct property of the blended stream (which may be measured by an automatic analyzer fed by the blended stream) is affected by the quantity of each of these respective components in the blended stream. To particularize, one of these components is butane; the quantity of butane in the blended stream affects the so-called Reid vapor pressure of the blended stream or product. The other of these components is a lead-containing octane-improver compound (referred to herein for convenience as simply "lead"); the quantity of lead in the blended stream affects the octane number of the blended stream or product.

During any gasoline blending "run," it is desired to maintain the Reid vapor pressure and the octane number of the blended stream substantially constant, that is, at particular predetermined values. Therefore, the broad or general purpose of the system of the present invention is to maintain a property of a blended liquid stream substantially constant, this being done by automatically adjusting the percentage or quantity of butane, for example, in accordance with the output of a Reid vapor pressure analyzer fed by the blended stream, or by automatically adjusting the percentage or quantity of lead in accordance with the output of an octane analyzer fed by the blended stream.

An object of this invention is to provide a novel automatic control system for use in blending operations.

Another object is to provide a novel blend control unit which will automatically adjust the quantity of a given stream (blending component) in accordance with variations in the output of an analyzer associated with that stream.

A further object is to provide a novel blend control unit which will automatically adjust the quantity of a given stream in such a way as to maintain a property of the blended stream substantially constant.

A still further object is to provide a blend control unit which will automatically adjust the quantity of a given stream in accordance with variations in the output of an analyzer associated with that stream, but which will inhibit the quantity adjustment from going beyond predetermined limits, and which will activate an alarm when any one of the limits has been reached.

A detailed description of the invention follows, taken in conjunction with the accompanying drawings, wherein:

FIG. 5 is a simplified circuit schematic of an arrangement of indicator tubes and a pulse summing subassembly;

FIG. 6 is a simplified circuit schematic of a zero detector subassembly;

FIG. 7 is a simplified circuit schematic of a limit circuit board; and

FIG. 8 is a simplified circuit schematic of a maximum percentage alarm subassembly.

Figure 1:
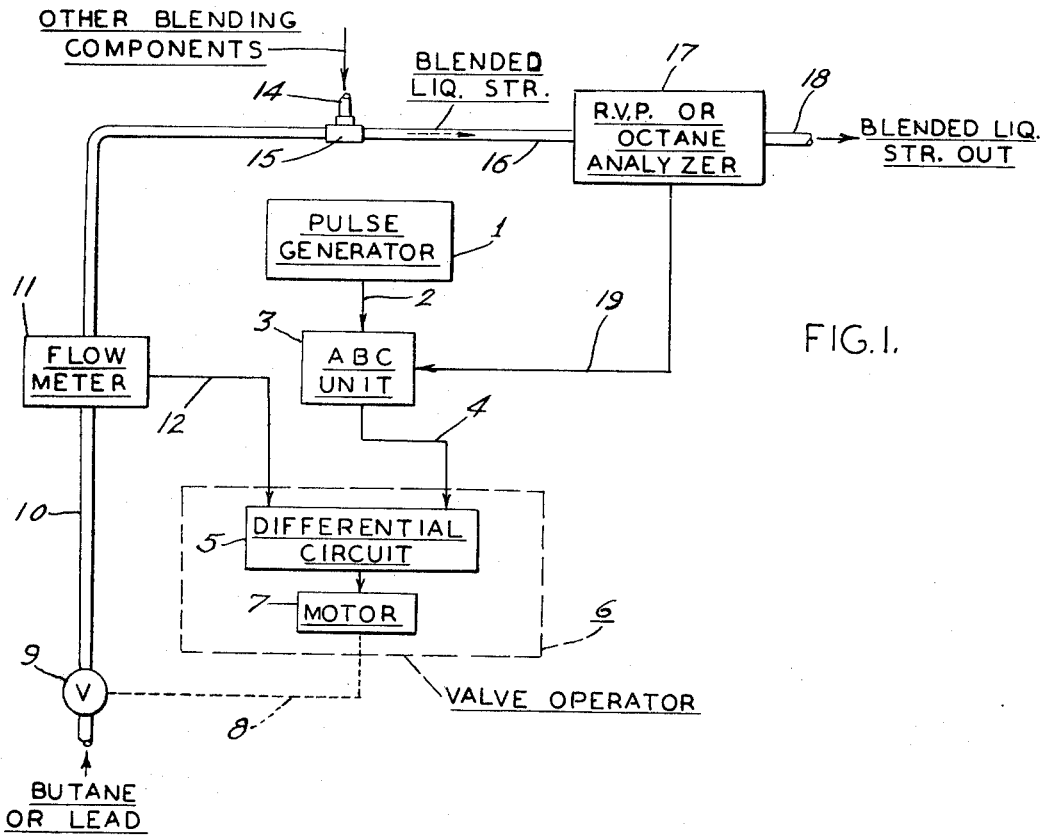
FIG. 1 is a simplified block diagram of a blending system utilizing this invention.

Refer first to FIG. 1. A pulse generator 1, operating for example at about 100 pulses per second, provides the master control for the blending system as a whole. Pulse generator 1 utilizes solid-state circuitry, and generally comprises a basic oscillator connected with gates and BCD (Binary Coded Digit) counters to provide gated output pulses in binary coded form at its output terminals. For simplicity, only a single output 2 is shown for the pulse generator in FIG. 1, although there are actually 12 output terminals on this pulse generator. During some unit time interval, there would be provided on these output terminals: 1, 2, 4, and 8 pulses respectively on four "units" terminals; 1, 2, 4, and 8 pulses respectively on four "tenths" terminals; and 1, 2, 4, and 8 pulses respectively on four "hundredths" terminals. The "units" pulses would of course be decimally related to the "tenths" pulses and to the "hundredths" pulses.

By appropriate selection, referred to a binary or base two counting scheme, any number of pulses, from zero through nine, can in effect be selected in each of the three groups (of four terminals each) referred to. This selection is made by an ABC (Automatic Blend Control) Unit or module, denoted generally by numeral 3, to which the output terminals of pulse generator 1 are connected. The unit 3, comprising the heart of the present invention, will be described in detail hereinafter. Assume for the moment that a selection has been made by unit 3; in this case, a selected number of pulses (derived from pulse generator 1) is caused to appear on output lead 4 of unit 3, during each unit or basic time interval.

The unit 3 comprises a controller for a component of a blended liquid stream. For example, this may be either the butane or the lead component of a gasoline stream being blended. In practice, one module or unit 3 would be used as a controller for the butane component, and a separate but closely duplicated unit 3 would be used as a controller for the lead component. Assume first that the butane component is being controlled. The pulses appearing on output lead 4 (as determined by the ABC action of unit 3) may be fed to one input of a differential circuit 5 in the valve operator 6. The output of circuit 5 is used to drive a bidirectional motor 7 in the valve operator. The output shaft 8 of motor 7 (which shaft is illustrated schematically in FIG. 1) is connected through suitable gearing to the operating shaft (stem) of a valve 9 which requires rotary motion for its operation and which is inserted in the flow conduit 10 for the butane component. The motor 7, when it turns in one direction, opens valve 9; when this motor turns in the opposite direction, it closes valve 9. Valve 9 serves as a flow controlling device for the butane component.

In the same conduit as valve 9, but downstream from this valve, is a flowmeter 11 which senses the flow of fluid through conduit 10. Flowmeter 11 may be, for example, a turbine-type flowmeter, such as that disclosed in U.S. Pat. No. 3,136,159, June 9, 1964. Such a flowmeter generates pulses, independently of any external power source, at a rate proportional to the fluid flow being metered; these pulses can be readily amplified.

Pulses are produced by the metering device (flow sensing device) 11 at a rate proportional to the fluid flow rate through conduit 10. These pulses appear at the output 12 of the flowmeter and are fed to the other or second input of the differential circuit 5.

The differential circuit 5 compares the pulses fed to its two inputs. If these two sets of pulses are coming into circuit 5 at the same rate, there will be no output from this circuit to motor 7, and this motor will not rotate. Consequently, there will be no movement of valve 9. If, however, the rate of one set of pulses is faster than that of the other, there will be an output from circuit 5 to motor 7, the sense of this output depending on which set of pulses has the faster rate. Motor 7 will then rotate in one direction or the other, depending on the sense of the output from circuit 5. Valve 9 will then open or close, depending on the direction of motor rotation.

If changes take place in unit 3 (in a manner to be described) such as to adjust or vary (either up or down) the number of pulses appearing on output lead 4, the change in the pulse rate applied to circuit 5 will result in adjustment of the valve 9 to a new position, thereby to cause the pulse rate from meter 11 to match this varied pulse rate. The result is that the flow rate of butane will be controlled by the pulse generator 1, acting through unit 3 and valve operator 6.

Summarizing the foregoing, the action of the system components so far described causes the valve 9 to be brought to a position wherein the fluid flow rate through flowmeter 11 (and through the valve 9 and conduit 10) is such that the pulse rate from the meter 11 matches exactly the pulse rate from the unit 3. At that time, the pulse rates from 11 and 3 will be equal, and there will be no output from the differential circuit 5 to drive motor 7 so as to change the position of valve 9. At this position, then, the flow rate of the butane stream will be exactly proportional to the pulse rate of pulse generator 1 multiplied by the percentage rate established by unit 3.

The above action is somewhat similar to that described in U.S. Pat. No. 3,249,115, May 3, 1966.

The conduit 10, carrying for example butane, and one or more other conduits such as 14, carrying the other or remaining blending components, may be considered as coming together at a junction point or tee 15, which thus marks one end of a pipe or conduit 16 carrying the blended liquid stream (blend of butane plus all of the other liquid blending components).

According to this invention, a specific property of the blended liquid stream (blended product) is measured, and in response to unpredictable or fortuitous variations in the magnitude of such property from a predetermined (desired) value or magnitude, the proportion of one particular liquid component (to wit, the component which mainly affects this specific property) is adjusted or varied automatically, to return the said specific property to its desired or proper value. For the butane component being now described, the specific property would be the Reid vapor pressure of the blended stream.

A Reid vapor pressure analyzer 17 is coupled into the blended-liquid line 16, to receive the blended stream and to measure the Reid vapor pressure of the blended liquid. Although in FIG. 1 it is indicated that the entire blended liquid stream passes through analyzer 17, in actual practice it would be appropriate to supply only a sample of the blended liquid stream to analyzer 17. In FIG. 1, the blended liquid stream is illustrated as exiting from the analyzer 17 by way of a conduit 18.

The vapor pressure analyzer 17 operates in a known manner to produce an output electrical signal representative of the value or magnitude of the Reid vapor pressure of the blended gasoline stream in conduit 16, and this output signal is fed to unit 3 by way of a connection 19. Connection or lead 19 supplies the analyzer input to unit 3, to which further reference will be made hereinafter. Speaking generally, the ABC Unit 3 acts to automatically vary or adjust the number of pulses supplied to its output lead 4, as the analyzer input supplied at 19 to unit 3 varies (either upwardly or downwardly).

For the lead blending component, substantially exact duplicates of elements 3-13 would be employed, the ABC Unit for the lead component being fed from the same single, common pulse generator 1 used for the butane unit 3. In fact, this common pulse generator is used for controlling all of the components of the blended gasoline stream, but in the case of the remaining components (other than butane and lead) the pulses are fed to the respective valve operators through fixed (that is, manually settable) percentage switches, essentially in the manner described in U.S. Pat. No. 3,272,217, Sept. 13, 1966.

For the lead blending component, the specific property of the blended stream to be measured would be the octane number; it is pointed out that the octane number of the blended stream is affected mainly by the proportion of lead in such stream. Thus, in the case of the lead stream or component, an octane analyzer would be used at 17, to receive the blended stream and to measure the octane number of the blended liquid. Such octane analyzer would then operate in a known manner to produce an output electrical signal representative of the value or magnitude of the octane number of the blended gasoline stream. In the case of the lead stream, the ABC unit acts to automatically vary or adjust the number of pulses supplied to its output lead, as the output of the octane analyzer (supplied as analyzer input to such unit) varies, either upwardly or downwardly.

Figure 2:
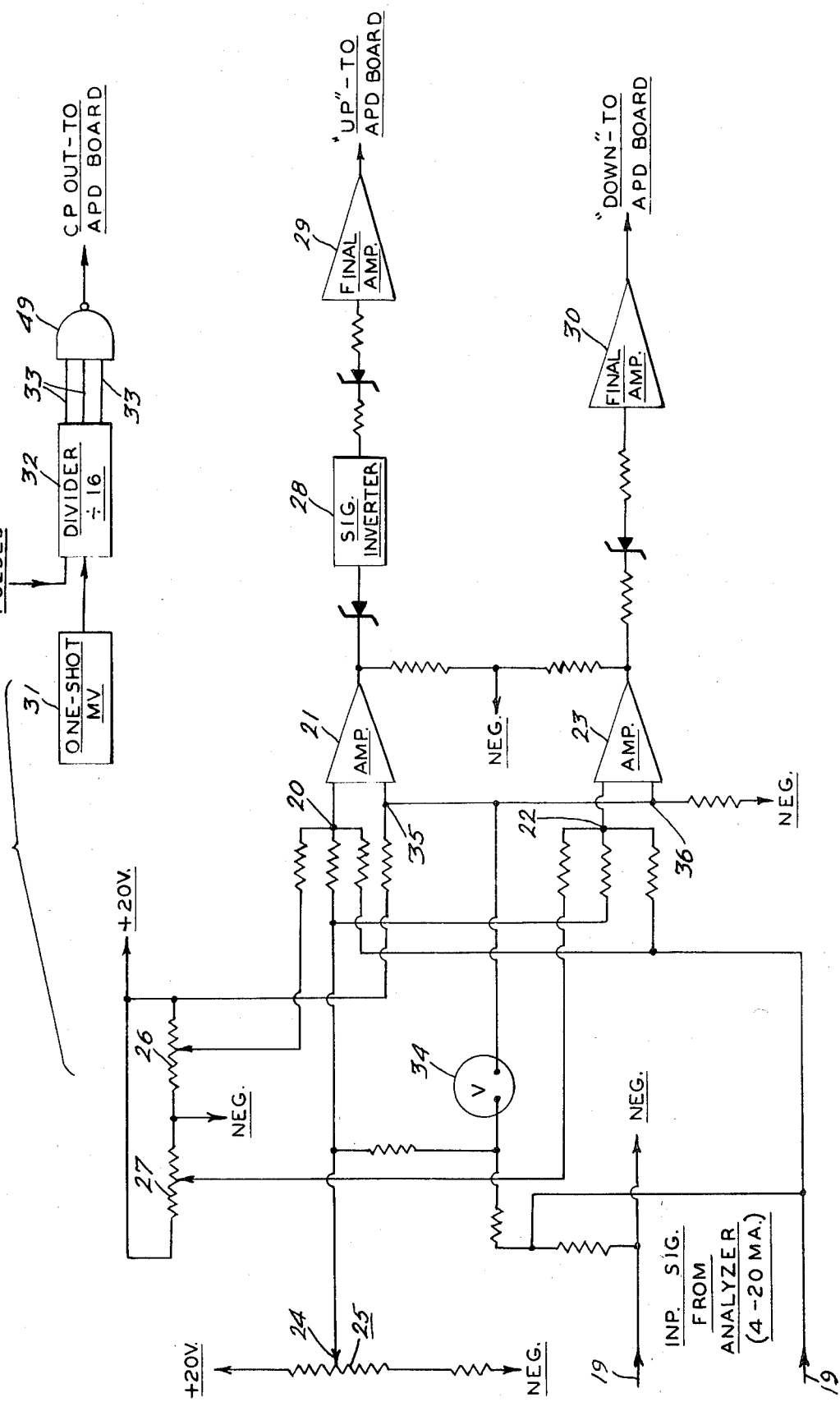
FIG. 2 is a simplified circuit schematic of a timing pulse and up/down control subassembly.

Refer now to FIG. 2, which is a schematic circuit diagram of a circuit subassembly (forming part of the ABC unit 3) termed a Timing Pulse and Up/Down control (TPUDC). This circuit subassembly is composed of solid-state devices (mostly in the form of integrated circuits) and is assembled and wired in the form of a printed circuit board. There are a plurality of these boards included in the unit 3; they will be referred to as the description proceeds.

The input signal to unit 3 from the analyzer 17 (FIG. 1) reaches the TPUDC Board by way of two leads which together comprise the connection 19. This signal is a 4—20 milliampere electrical signal the actual value of which, at any moment, is proportional to the magnitude of the property being measured by the analyzer (Reid vapor pressure, in the case of the vapor pressure analyzer, or octane number, in the case of the octane analyzer). This "analyzer input" signal is in effect converted to a voltage signal and fed in parallel (over separate respective resistors) to a summing input terminal 20 of an operational amplifier 21 and to a summing input terminal 22 of an operational amplifier 23.

An analyzer set point voltage is also fed to these same amplifier input terminals 20 and 22. When the ABC Unit 3 is being used to trim butane, this set point voltage is obtained from the movable contact 24 on a potentiometer 25 supplied from the d. c. power source. In this case, the analyzer set point voltage may be adjusted by means of a knob provided on the front panel of the unit, the range of adjustment being 5–15 psi (Reid vapor pressure).

When the ABC Unit 3 is being used with the octane analyzer, the potentiometer 25 is rendered ineffective (by internal connections, not shown), and the analyzer set point is automatically adjusted to 50 percent, inasmuch as this setting corresponds to the target octane. That is to say, with the octane analyzer the analyzer set point voltage is fixed and is independent of any front panel adjustment.

A pair of offset potentiometers 26 and 27, whose movable contacts are connected respectively to amplifier terminals 20 and 22, furnish offset voltages to these amplifiers to establish a "dead zone" in the vicinity of the analyzer set point.

The amplifiers 21 and 23 each function as an "on-off" Schmitt Trigger. The amplifiers 21 and 23 in effect compare an analyzer output signal (on lead 19) with an analyzer set point voltage and, when the analyzer signal is beyond the "dead zone," develop an output signal (from the TPUDC Board) which tells the percentage of the lead or butane component to either increase or decrease.

The summing of the various voltages (namely analyzer output, analyzer set point, and offset) in effect takes place at terminal 20 for amplifier 21, and at terminal 22 for amplifier 23. When the analyzer output voltage is on the low side of the analyzer set point, beyond the "dead zone" (which would call for an increase or "up" count in the component percentage set point), an "off" or "zero" signal appears at the output of amplifier 21. This is inverted to an "on" or "one" by a signal inverter 28, and again to an "off" or "zero" at the output of a final amplifier 29, this "zero" signal being transmitted to an Auto Percent Drive (APD) circuit board illustrated in FIG. 3.

When the analyzer output voltage is on the high side of the set point, beyond the "dead zone" (which would call for a decrease or "down" count in the component percentage set point), an "on" or "one" signal appears at the output of amplifier 23. This is inverted to an "off" or "zero" signal by the final amplifier 30, this "zero" signal being likewise transmitted to the APD Board.

The TPUDC Board also includes a one-shot multivibrator 31, which produces pulses at the rate of one every 30 seconds, for example. These pulses are fed into a divider (a shift register) 32 having a plurality of output leads 33 from which timing pulses may be selected at rates from one pulse every 30 seconds to one pulse every 8 minutes. These timing pulses are used to control the rate of variation or rate of adjustment of the component percentage set point. Using these pulses, the component percentage set point will be stepped up or down (as required by the analyzer output signal) at a selected rate, from once every 30 seconds to once every 8 minutes. Or (in the case of the octane analyzer) external timing pulses supplied by this analyzer may be applied to item 32, producing timing pulses at 33 which will cause the component percentage set point to step or shift up or down (if required) at a rate in accordance with these external timing pulses. These timing pulses may be termed clock pulses (CP).

Figure 3:
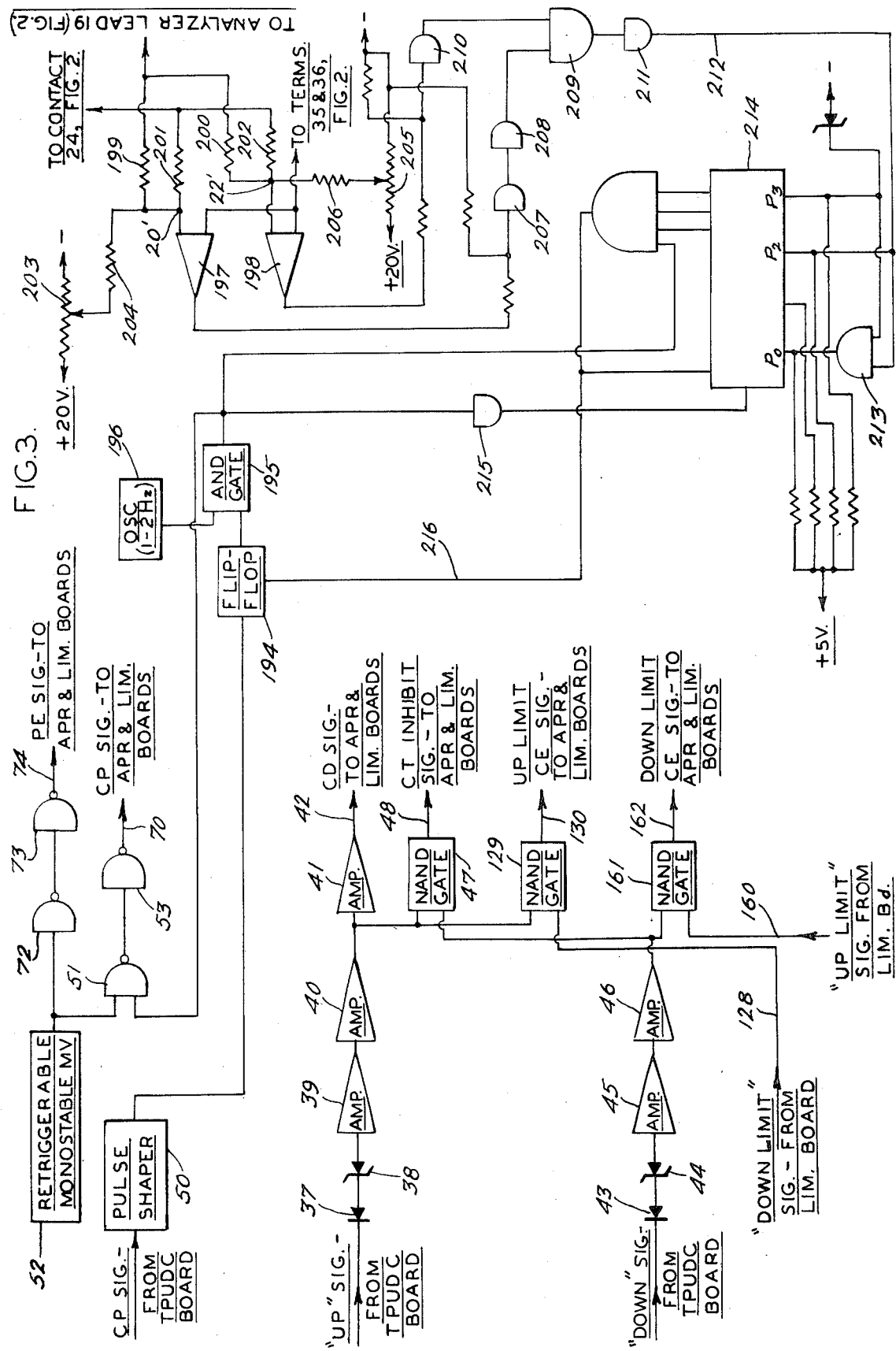
FIG. 3 is a simplified circuit schematic of an auto percent drive subassembly.

The pulses produced at 33 are fed through an OR gate 49 for summing to produce the CP signals, which are fed out from the TPUDC Board to the APD Board (FIG. 3).

The TPUDC Board also includes a null indicator or null meter 34 (for example, a voltmeter) which is connected between the analyzer set point contact 24 and the commonly connected terminals 35 of amplifier 21 and 36 of amplifier 23. The null indicator 34 thus indicates how far away from the analyzer set point the analyzer value (output) is.

In addition, an "up" correcting light (not shown) is suitably connected to the output of amplifier 29, and a "down" correcting light (not shown) is suitably connected to the output of amplifier 30. The TPUDC Board activates these correcting lights selectively, depending on the relative sense and relative value of the analyzer set point and analyzer information.

Refer now to FIG. 3, which is a schematic circuit diagram of the APD circuit board. The "up" signal (output of amplifier 29, FIG. 2) is fed by way of a diode 37 and a Zener diode 38 into and through a first amplifier 39, and thence through a second amplifier 40. The output of amplifier 40 is fed through another amplifier 41 to provide a Count Direction (CD) signal on output lead 42, which latter signal is fed to the Auto Percent Reset (APR) circuit board of FIG. 4. This CD siganl, which is in effect derived from the "up" signal previously mentioned, is "on" or "one" (again, as hereinabove, referring to a binary scheme of signals) when the analyzer output voltage is on the low side of the analyzer set point, beyond the "dead zone," and is otherwise "off" or "zero."

The "down" signal (output of amplifier 30, FIG. 2) is fed by way of a diode 43 and a Zener diode 44 into and through a first amplifier 45, and thence through a second amplifier 46. Signal output from amplifier 46 is fed to a NAND gate 47, along with signal output from amplifier 40. The NAND gate 47 produces at its output 48 a "zero" when all the inputs thereto are "ones," and a "one" when any of the inputs thereto is "zero." The output of gate 47 is a Count Inhibit (CT Inhibit) Signal, which is fed to the APR Board of FIG. 4. This CT Inhibit Signal is "off" or "zero" throughout the "dead zone" around the analyzer set point, but is "on" or "one" both above and below such "dead zone."

In the APD Board of FIG. 3, the CP Signal from the TPUDC Board is fed into a retriggerable monostable multivibrator 50 operating as a pulse shaper. The output of the integrated circuit 50 is fed into a controllable flip-flop circuit 194, and the output of this latter circuit is fed as one of the two inputs to an AND gate 195. The other input to gate 195 is obtained from a very low frequency (1–2 Hz) oscillator 196. Signal output from the AND gate 195 is fed into an OR gate 51, along with the signal from another retriggerable monostable multivibrator 52 (to be later referred to). From the output of gate 51, the CP Signal (which may comprise three pulses or one pulse, for example, depending on the variation of the analyzer output voltage with respect to the analyzer set point, as will later be described) is passed through a signal inverter 53, and thence to the APR Board of FIG. 4, by way of a lead 70.

The APD Board includes a pair of operational amplifiers 197 and 198 structurally quite similar to the amplifiers 21 and 23 of FIG. 2, previously described, and having their inputs connected essentially in parallel to those of amplifiers 21 and 23. The "analyzer input" signal is fed over a resistor 199 to a summing input terminal 20' of amplifier 197, and over a resistor 200 to a summing input terminal 22' of amplifier 198. The "analyzer set point" voltage is fed over a resistor 201 to input terminal 20', and over a resistor 202 to input terminal 22'. An offset potentiometer 203 has its movable contact connected over a resistor 204 to amplifier terminal 20'. An offset potentiometer 205 has its movable contact connected over a resistor 206 to amplifier terminal 22'. The potentiometers 203 and 205 furnish offset voltages to the amplifiers 197 and 198, respectively, to establish a "dead zone" in the vicinity of the analyzer set point.

The signal output of amplifier 197 goes through two stages 207 and 208 of amplification to one input of a gating (combining) device 209. The signal output of amplifier 198 goes through a single stage 210 of amplification to the other input of device 209. The combined output from device 209 goes through a single stage 211 of amplification, to provide an output signal on an output lead 212 connected to this last-mentioned amplification stage.

The summing of the various voltages (namely analyzer output, analyzer set point, and offset) at the inputs of the amplifiers 197 and 198, and the combining of the amplifier outputs, causes the production on output lead 212 of an "on" or "one" signal when the analyzer output voltage is within a narrow band on either side of the analyzer set point, but beyond the so-called "dead zone"; an "off" or "zero" signal is produced on lead 212 when the analyzer output voltage is beyond the narrow band just mentioned, on either side of the analyzer set point, that is, when there is a large variation of the analyzer output voltage with respect to the analyzer set point.

The signal on output lead 212 is applied through a signal inverter 213 to the "$P_0$" terminal of a shift register (integrated circuit) 214 connected as a variable modulo or divide-by-N counter, and is applied directly to the "$P_2$" terminal of this shift register. The number N is determined by the signal on output lead 212. With the setup illustrated, when the signal on output lead 212 is a "one," N is 1, and when the signal on output lead 212 is a "zero," N is 3. Alternatively, another circuit (not shown) could be utilized to essentially provide a different bias on the "$P_3$" terminal of register 214 and on one input of device 213; if this latter circuit is used, N would be 2 when the signal on output lead 212 is a "one" and would be 6 when the signal on output lead 212 is a "zero."

The input to the divide-by-N counter 214 is obtained from the gate 195 through a signal inverter 215, and the output of this counter is applied to the flip-flop 194, by way of a lead 216.

Each clock pulse CP derived from the TPUDC Board, and applied to the flip-flop circuit 194 by way of pulse shaper 50, causes the circuit 194 to be placed in such a state as to provide an enabling voltage to the AND gate 195, and this AND gate will then pass pulses (derived from oscillator 196) to the OR gate 51 and to the divider 214, the number of pulses so passed to gate 51 (as a CP Signal for the APR Board, and also for the Limit Board) being determined by N of the divider 214 (which produces an output pulse for every N-input pulse), the output pulse produced by this divider being utilized to reverse the state of circuit 194 and thus to disable the AND gate 195. Thus, when the analyzer output voltage is within a narrow band on either side of the analyzer set point, but beyond the so-called "dead zone" (in which case N of divider 214 is 1), one pulse (or two pulses, if the "alternative circuit" described is utilized) is produced as a CP Signal for the APR Board in response to each CP Signal pulse received from the TPUDC Board; when the analyzer output is beyond the aforementioned narrow band, on either side of the analyzer set point (in which case N of divider 214 is 3), three pulses (or six pulses, if the "alternative circuit" described is utilized) are produced as a CP Signal for the APR Board in response to each CP Signal pulse received from the TPUDC Board.

Figure 4:
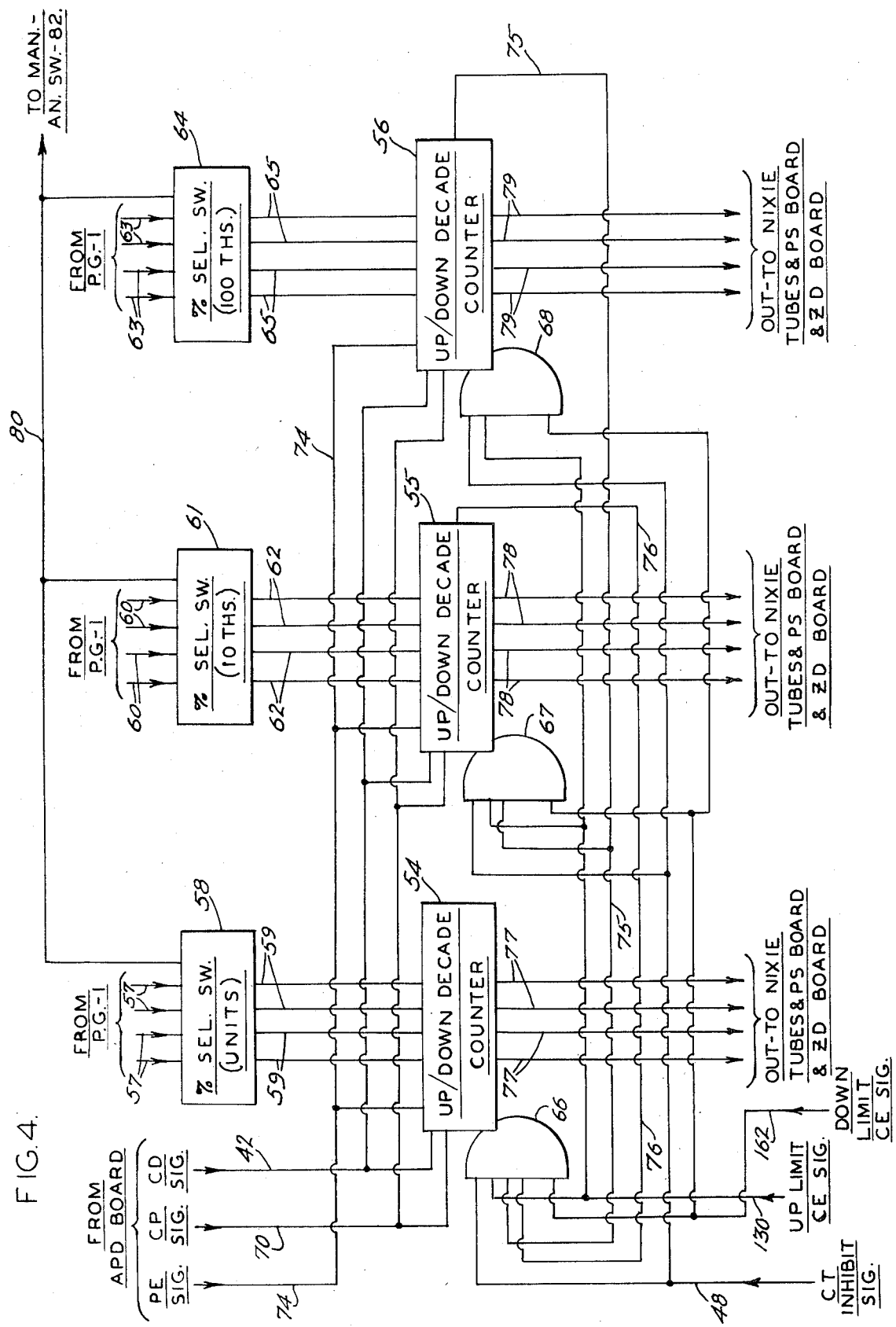
FIG. 4 is a simplified circuit schematic of an auto percent reset subassembly.

The monostable multivibrator 52 is triggered to produce an output pulse (for resetting) whenever the ABC unit is put into operation on "manual" control, or whenever resetting becomes appropriate (as, for example, when the power to the unit goes off and then comes back on). This output pulse from integrated circuit 52 is fed through suitable coupling devices (e.g., amplifiers) 72 and 73 to provide at 74 a PE (for Parallel Enable) Signal which is fed to the APR Board of FIG. 4, and is also fed through gate 51 to the various circuits which utilize the CP Signal. Summarizing, the APD Board of FIG. 3 converts the information from the TPUDC Board (FIG. 2) to the necessary logical information to feed the up/down decade counters 54-56 which are located in the APR Board (FIG. 4). The APD Board also generates the necessary signals, in conjunction with the manual percent selector switches 58, 61, and 64 (FIG. 4) to reset the counters 54—56 in the APR Board to the values indicated on such percent switches.

Refer now to FIG. 4. The APR Board includes three exactly similar MSI (Medium Scale Integration) up/down decade counters which have the form of shift registers and which may be thought of as operating to count pulses applied thereto, counter 54 operating for units, counter 55 for tenths, and counter 56 for hundredths.

From the master pulse generator 1 (previously referred to in connection with FIG. 1), pulses in binary relation to each other (that is, as 1, 2, 4, and 8) are fed by way of the four leads denoted by numeral 57 to the input side of one section of a manually operable (thumbwheel type) percentage selector switch 58 for "units," and the pulses selected by switch 58 are utilized under "Manual" operation conditions, as will be described hereinafter. The switch 58 has another section which (selectively, as selected by this switch, and in binary fashion) ground the four leads denoted by numberal 59 (which leads are connected between switch 58 and four parallel terminals provided on counter 54), for presetting the counter 54.

From the master pulse generator 1, pulses in binary relation to each other, but in decimal relation to the pulses fed to selector switch 58, are fed by way of the four leads denoted by numeral 60 to the input side of one section of a manually operable percentage selector switch 61 (similar to switch 58) for "tenths," and the pulses selected by switch 61 are utilized under "Manual" operation conditions. The switch 61 has another section which (selectively, as selected by this switch, and in binary fashion) grounds the four leads denoted by numeral 62 (which leads are connected between switch 61 and four parallel terminals provided on counter 55), for presetting the counter 55.

From the master pulse generator 1, pulses in binary relation to each other, but in decimal relation to the pulses fed to selector switch 61, are fed by way of the four leads denoted by numeral 63 to the input side of one section of a manually operable percentage selector switch 64 (similar to switch 58) for "hundredths," and the pulses selected by switch 64 are utilized under "Manual" operation conditions. The switch 64 has another section which (selectively, as selected by this switch, and in binary fashion) grounds the four leads denoted by numeral 65 (which leads are connected between switch 64 and four parallel terminals provided on counter 56), for presetting the counter 56.

Each of the counters 54–56 has a PE terminal, to all of which terminals (in parallel) is fed the PE signal pulse, obtained from the APD Board by way of lead 74. The PE terminals of the counters, and the lead 74, are in effect used to transfer the count set up or established (for counter presetting) by switches 58, 61, and 64 to the up/down decade counters 54–56. Thus, whenever a PE Signal pulse is applied at 74 to the counters (that is, when the ABC unit is initially put into operation, or whenever resetting of the counters becomes necessary), counters 54–56 will have put into them, as a "count," the percent value indicated by the manual switches 58, 61, and 64. In effect, then, the PE Signal pulse initially gates the count established by switches 58, 61, and 64 into the respective counters 54, 55, and 56 as a "count." During automatic operation, however (as will later become apparent), the "count" in counters 54–56 may vary up or down from this initially-established number (established in accordance with the settings of the manual selector switches 58, 61, and 64).

Each of the counters 54–56 is provided with a plurality of terminals which are connected in multiple (as denoted by numerals 66, 67, and 68 for the counters 54, 55, and 56 respectively) to the CE (for control enable) terminals of the respective counters. Signal voltages may be applied to these terminals to inhibit the up/down counting action of the counters, the arrangement being such that if any of these signal voltages are "zero" or "off," the counters will count neither up nor down, but will remain at whatever "count" is then stored therein.

The CT Inhibit Signal derived from the APD Board (FIG. 3), and which is "zero" in the "dead zone" around the analyzer set point, is fed as one of these last-mentioned signal voltages in parallel to the CE terminals of counters 54, 55, and 56 by way of lead 48. In this way, up or down counting of the counters is prevented or inhibited if the analyzer voltage is within the "dead zone" on either side of the analyzer set point.

To properly order the counters and transfer the "tens" counts, a lead 75 extends from the TC (for Tens Carry) terminal of the lowest-order counter 56 to one of the multipled CE terminals 66 and 67, respectively, in each of the two higher-order counters 54 and 55, and a lead 76 extends from the TC terminal of the intermediate counter 55 to one of the multipled CE terminals 66 in the highest-order counter 54. These leads 75 and 76 provide for proper "tens carry" action between the ordered counters.

Each of the counters 54–56 has a CP terminal, to all of which terminals (in parallel) is fed the CP signal obtained from the APD Board, by way of a lead 70. Assuming that the counters 54–56 have been initially set (or reset) to the "count" indicated on the manual selector switches 58, 61, and 64, then by adding (or subtracting) a clock pulse (CP) to the counter inputs, such counters may be stepped up or down one count for each clock pulse so added or subtracted. The foregoing assumes, of course, that the counters are not inhibited by the CT Inhibit Signal, or inhibited in some other manner yet to be described. Thus, it may be stated that, in general, whenever the analyzer voltage is beyond the "dead zone," on either side of the analyzer set point, the counters 54–56 will step up or down one count for each clock pulse added or subtracted to the counter inputs.

The direction, up or down, in which the counters 54–56 so step is determined by the CD (Count direction) Signal obtained from the APD Board. Each of the counters has a CD terminal, to all of which terminals (in parallel) is fed the CD Signal obtained from the APD Board, by way of lead 42. The arrangement is such that when the CD Signal is "on" or "one," the counters 54–56 will count up; when this signal is "off" or "zero," the counters will count down. Since (as previously described) the CD Signal voltage is "on" when the analyzer voltage is beyond the "dead zone," on the low side of the analyzer set point, and is otherwise "off," it follows that the counters 54–56 will count up when the analyzer voltage is on the low side of the analyzer set point (and beyond the "dead zone"), and will count down when the analyzer voltage is on the high side of the analyzer set point (and also beyond the "dead zone").

The percentage "count" initially established in the counters 54–56 depends on the settings of the switches 58, 61, and 64, since it is these switch settings which set up or establish (that is, preset) the "initial count" into the counters. This "initial count" remains in the counters thereafter, during automatic or "analyzer" operation, but is subject to being changed (by stepping up or down, as required by the analyzer output voltage, at a rate determined by the CP Signal pulses).

The signal outputs (in binary-coded digital form) of the up/down counters 54–56 on the APR Board of FIG. 4 drive Nixie indicator tubes (see FIG. 5) which indicate the actual output of the up/down counters; they also activate the proper input gates of the PS (for Pulse Summing) Board, and send signals to the ZD (for Zero Detector) Board, to be described later. The four output leads of counter 54 are denoted by numeral 77; the four output leads of counter 55 are denoted by numeral 78; the four output leads of counter 56 are denoted by numeral 79.

The ABC Unit is initially put into operation under "manual" control conditions (wherein the component percentage set point is established in accordance with the settings of the manual selector switches 58, 61, and 64); following this, the unit is switched over to automatic or "analyzer" control. For "manual" control, the pulse outputs selected in one section of the selector switches 58, 61, and 64 (the number of pulses in such outputs being determined by the settings of the switches) are combined by means of a lead 80 and fed to the "Man" (for manual) fixed contact 81 of a manual-analyzer switch 82 (FIG. 5). The movable contact of switch 82 is connected to the ABC Unit output lead 4 (FIG. 1). Thus, under "manual" control conditions, switch 82 is on "Man" contact 81, and the output of the ABC Unit 3 (which is used to control the valve 9 in the manner previously described) is uniquely determined by the settings of the manual selector switches 58, 61, and 64.

Refer now to FIG. 5. The signal output at 77 of the up/down counter 54 is utilized to drive the electrodes of a BCD (for Binary-Coded Decimal) Nixie indicator tube in block 83, the tube in block 83 thus indicating (in decimal digit form) the "units" in the actual output of the counter 54 (i.e., the actual "count" in this counter) during operation of the ABC Unit of the invention.

The signal output at 78 of the up/down counter 55 is utilized to drive the electrodes of a similar BCD Nixie indicator tube in block 84, the tube in block 84 thus indicating (in decimal digit form) the "tenths" in the actual output of the counter 55 (i.e., the actual "count" in this counter).

The signal output at 79 of the up/down counter 56 is utilized to drive the electrodes of a similar BCD Nixie indicator tube in block 85, the tube in block 85 thus indicating (in decimal digit form) the "hundredths" in the actual output of the counter 56 (i.e., the actual "count" in this counter).

The four similar output leads 77 are also connected respectively each to a separate "two-input gate" (integrated circuit) operating as an AND gate, these four gates being denoted by reference numerals 86, 87, 88, and 89. The gates 86-89 form part of the PS Board proper. Binary-coded pulses from the "units" output terminals of the master pulse generator 1 (in the set flow module) are also fed to the gates 86-89, the four leads from the pulse generator being connected to the AND gate inputs through respective pulse inverter or signal inverter integrated circuits 90, 91, 92, and 93. The outputs of the four AND gates 86-89 are combined on a common bus 94 and fed to one input of a three-input gate (integrated circuit) 95 operating as an OR gate. The commoned output of gate 95 is fed through a three-input gate (similar in construction to gate 95, but operating as a simple signal inverter) 96, and the output of inverter 96 goes to the "An" (for analyzer) fixed contact 97 of switch 82.

The pulses required to make up the "units" digit of the component percentage set point are gated (at 86-89) by the inputs (at 77) from the APR Board. These pulses are then (assuming the switch 82 has been set for automatic or "analyzer" operation) sent to the stream module (for butane, or lead) which the ABC Unit 3 (FIG. 1) is controlling, by way of ABC Unit output lead 4.

The four signal output leads 78 are also connected respectively each to a separate "two-input gate" similar to gates 86-89 and also operating as an AND gate, these four gates being denoted by reference numerals 98, 99, 100, and 101. Gates 98—101 also form part of the PS Board. Binary-coded pulses from the "tenths" output terminals of the master pulse generator 1 are also fed to the gates 98—101, the four leads from the pulse generator being connected to the AND gate inputs through respective pulse inverter or signal inverter integrated circuits 102, 103, 104, and 105. The outputs of the four AND gates 98-101 are combined on a common bus 106 and fed to a second input of the gate 95. Thus, the pulses required to make up the "tenths" digit of the component percentage set point are gated (at 98-101) by the inputs (at 78) from the APR Board.

The four signal output leads 79 are also connected respectively each to a separate "two-input gate" similar to gates 86-89 and also operating as an AND gate, these four gates being denoted by reference numerals 107, 108, 109, and 110. Gates 107-110 also form part of the PS Board. Binary-coded pulses from the "hundredths" output terminals of the master pulse generator 1 are also fed to the gates 107-110, the four leads from the pulse generator being connected to the AND gate inputs through respective pulse inverter or signal inverter integrated circuits 111, 112, 113, and 114. The outputs of the four AND gates 107-110 are combined on a common bus 115 and fed to a third input of the gate 95. Thus, the pulses required to make up the "hundredths" digit of the component percentage set point are gated (at 107-110) by the inputs (at 79) from the APR Board.

Summarizing, the train of pulses required to make up the component percentage set point is gated by the inputs (at 77-79) from the APR Board; this train of pulses is then sent (under automatic or "analyzer" operating conditions) to the stream module which the ABC Unit of the invention is controlling (either butane or lead, for example).

As previously described, the "count" in the counters 54-56, under automatic or "analyzer" operation, steps up or down in response to the analyzer output voltage, and as required by the analyzer output voltage, as the latter varies to one side or the other (beyond the so-called "dead zone") of the analyzer set point. This variation of the "count" in the counters changes (by means of the PS Board of FIG. 5) the component percentage set point, and this change is always in such a direction as to tend to maintain (by means of the stream control arrangement of FIG. 1) the analyzer output voltage at or very close to the analyzer set point.

Essentially, the purpose of the ABC Unit described is to adjust the percent or quantity of a given stream (butane or lead, for example) in accordance with variations of an analyzer associated with that stream. The amount of lead blended into or injected into the final or blended product is adjustable (by means of an adjustable component percentage set point), and is controlled by the output of the octane analyzer; the amount of butane blended into or injected into the final, blended product is likewise adjustable (by means of an adjustable component percentage set point), and is controlled by the output of the Reid vapor pressure analyzer. This action has been previously described. Inasmuch as the component percentage set points can be stepped up or down automatically, in accordance with analyzer information, it is necessary to establish limits from which the ABC Unit is prohibited from stepping. According to this invention, four limits are established, and at each of these four limits an alarm is sounded, so that the operator will know that one of the limits has been reached.

The first of these limiting arrangements activates an alarm when the component percentage set point is stepped down to zero, and the system is inhibited from driving (automatically) below zero; however, if a signal is received to increase the percentage, the unit automatically starts stepping up, to increase the component percentage above zero. This will now be described.

Refer now to FIG. 6. The counter output "units" leads 77, in addition to being connected to the Nixie tube in block 83 and to gates 86–89, are connected through separate respective signal inverters 116 to four of the eight inputs of an eight-input NAND gate 117 in the ZD Board of FIG. 6. The counter output "tenths" leads 78, in addition to being connected to the Nixie tube in block 84 and to gates 98–101, are connected through separate respective signal inverters 118 to two of the inputs of gate 117 and to two of the eight inputs of an eight-input NAND gate 119 which is similar to gate 117. The counter output "hundredths" leads 79, in addition to being connected to the Nixie tube in block 85 and to gates 107–110, are connected through separate respective signal inverters 120 to four of the inputs of gate 119.

The output of gate 117 is fed through a signal inverter 121 to an output lead 122, and the output of gate 119 is fed through a signal inverter 123 to an output lead 124. The leads 122 and 124 are coupled as the two inputs to an OR gate 125 (which operates as a signal inverter), the output 126 of which goes to a limit board (LB) schematically illustrated in FIG. 7.

The ZD Board of FIG. 6 receives its information from the APR Board of FIG. 4 (the connections being shown through the PS Board of FIG. 5 merely for convenience of illustration herein), and its output 126 is normally five volts (corresponding to an "on" signal). However, when the counters 54–56 in the APR Board are all zeros (the count then being 0.00), the inputs 77–79 to the ZD Board are all zeros. Then, the outputs of the inverters 116, 118, and 120 (inputs to the NAND gates 117 and 119) will all be "ones," resulting in "zero" outputs from the NAND gates 117 and 119. These "zero" outputs will be inverted to "ones" on the leads 122 and 124, resulting in a "zero" output at 126 (which is the output of the ZD Board).

Refer now to FIG. 7, which is a schematic of the LB. The "zero alarm" signal lead 126 is connected as one of the inputs to a two-input gate (OR gate) 127, providing a "one" or "on" signal (a "down limit" signal) at the output 128 of this gate under "zero alarm" conditions. This "down limit" signal is applied as a "one" to a NAND gate 129 in the APD Board (FIG. 3), the other input to this gate being obtained from the output of amplifier 40. When counting "down" (the counting being, of course, that of counters 54–56 of FIG. 4), such as counting down to 0.00, the signal at the output of amplifier 40 has a value of "one." Thus, when the count is 0.00 and a "down" count is called for, both signals applied to NAND gate 129 are "ones," resulting in a "zero" signal at the output 130 of gate 129.

The last-mentioned "Up Limit CE" Signal (on output lead 130) is fed to the APR Board of FIG. 4 and to the LB of FIG. 7. This signal, which is a "zero" when the count is 0.00 and a "down" count is being calld for, is fed to the CE terminals of all of the counters 54–56, at 66, 67, and 68; the result is to inhibit the counting action of these counters. Thus, the system is inhibited from changing the quantity in the direction (down) which caused the limit (0.00) to be reached. On the other hand, when the count is 0.00 and an "up" count is being called for, there is a "zero" at the output of amplifier 40, giving a "one" output at 130. This "one" signal, applied to the CE terminals on the counters 54–56, does not produce any inhibiting action of these counters. Therefore, they are permitted to change the quantity in the direction (up) opposite to the direction (down) which caused the 0.00 limit to be reached.

The "zero alarm" signal at 126 (which, as stated, has a "zero" value when the counters 54–56 are all zeros) is also fed as one of the inputs to an "active pull-up buffer" (integrated circuit) 131 operating as an NAND gate. This signal provides a "one" at the output 132 of gate 131, since under the conditions mentioned a "zero" is applied to one of the inputs of this gate (normally all of the inputs to this gate are "ones").

This "zero alarm" signal is fed over a resistor 133 and a Zener diode 134 to the base of a transistor 135 in an alarm system which is arranged to provide an audible and visual alarm under certain "alarm" conditions. From the collector of transistor 135, the signal (which, it will be remembered, is a "one" at 132 when the count in the counters of FIG. 4 is 0.00) is fed over a resistor 136 and through a diode-resistor combination 137, 138 to the base of a transistor 139. The collector of this latter transistor is connected through a diode 140 and thence through an alarm relay (not shown) to a negative voltage, for activating an audible alarm, and through a diode 141 and thence through an alarm lamp (not shown) to a negative voltage, for providing a visual alarm. The arrangement of the alarm system described is such that the alarm relay and alarm lamp will be activated whenever there is a "one" signal at 132; thus, an alarm will be given for a count of 0.00 in the counters 54–56. A circuit for operating a flasher extends from resistor 136 through a transistor 69 and a diode 71. A SCR 142 is used for silencing the alarm, by means of a silencer switch (not shown, but coupled to the collector of this transistor).

The first of the limiting arrangements, just described, is applicable to both butane and lead.

The second and third limiting arrangements, applicable only to the ABC unit for lead, activate an alarm when the quantity of lead is either plus or minus 0.5 gram from the preset value (corresponding to a counter movement of plus or minus 50 counts in the counters such as 54–56, from their initial setting as established by the manual selector switches 58, 61, and 64), and the system is inhibited from going beyond these two limits. In the LB of FIG. 7, there are two up/down decade counters 143 and 144, each of which is exactly similar in construction to the counters 54–56 of FIG. 4. The counters 143 and 144 are supplied with a PE Signal from the APD Board of FIG. 3, by way of the lead 74 (just as are the counters 54–56), to establish an initial count therein. This PE Signal goes to the appropriate terminals of counters 143 and 144. However, the counters 143 and 144 are supplied with fixed voltage inputs by way of leads 145 and 146 (instead of being supplied from the manual switches 58, 61, and 64), such that any time the manual percent selector switches are moved from one value to another, the counters 143 and 144 are automatically reset to an initial "count" of fifty (rather than to a count determined by the selector switches, as are the counters 54–56).

During automatic or "analyzer" operation, the quantities or "counts" in the counters 143 and 144 are shifted simultaneously with those in the APR Board counters 54–56.

The "Tens Carry" arrangement 147 for the counters 143–144 is similar to the arrangements 75 and 76 for counters 54–56, previously described. The multipled CE Terminals of counter 143 are denoted by numeral 148, while the multipled CE Terminals of counter 144 are denoted by numeral 149.

The CP Signal (for counting up or down) is supplied to the appropriate terminals of counters 143 and 144 from the APD Board, by way of the lead 70, The CD Signal (for establishing the direction of the count, up or down) is supplied to the appropriate terminals of counters 143 and 144 from the APD Board, by way of lead 42.

The "zero" CT Inhibit Signal (for inhibiting counting within the "dead zone") is supplied to CE Terminals of counters 143–144 from the APD Board, by way of the lead 48.

The Up Limit CE Signal (which inhibits the counting action in the direction which caused a "zero count" to be reached by counters 54–56) is supplied to CE Terminals of counters 143 and 144 from the APD Board, by way of the lead 130.

The four binary-related output leads 150 of counter 143 are connected through separate respective signal inverters 151 to a common bus 152. The four binary-related output leads 153 of counter 144 are connected through separate respective signal inverters 154 to the bus 152. Te signal on bus 152 is fed through a signal inverter 155, the output 156 of this latter inverter being fed as another one of the inputs to the NAND gate 131.

It will be recalled that the counters 143 and 144 are automatically set to an initial count of 50, whenever the manual selector switches 58, 61, and 64 are set to some value. When these counters have moved down 50 counts from their initial setting (corresponding to a decrease in the quantity of lead of 0.5 gram from the preset value, as preset by the manual switches 58, 61, and 64), the count in the counters 143–144 is 00, giving "zeros" on all the leads 150 and 153. This produces a "one" signal at the output 132 of gate 131, which results in activating the alarm system in the same manner as described previously; thus, an alarm will be given when the up/down counters 143 and 144 have moved down 50 counts from their initial setting.

Under these conditions, there is a "zero" signal on the output lead 156; this signal is fed as the other of the two inputs to OR gate 127, to provide a "one" Down Limit Signal at output 128 under these alarm conditions. This results in a "zero" Up Limit CE Signal on lead 130, just as previously described for a count of 0.00 in counters 54–56 with a "down" count being called for; this Up Limit CE Signal is fed to counters 54–56 in the APR Board and to counters 143–144 in the LB. This "zero" Up Limit CE Signal inhibits the counting action in all of the counters in the direction which caused a "zero count" to be reached by counters 143–144. When the count in counters 143–144 is 00 and an "up" count is being called for, a "one" signal is provided at 130. This "one" signal does not produce any inhibiting action on the counters; therefore, all of the counters are permitted to count in the direction (up) opposite to the direction (down) which caused the "00" count to be reached in counters 143–144.

The LB includes a NAND gate 157 similar to gate 131. The first and fourth output leads 150 of counter 143, and the first and fourth output leads 153 of counter 144, provide the four input leads for gate 157. The output lead 158 of gate 157 comprises another one of the inputs to gate 131. When the counters 143–144 have moved up 49 counts from their initial setting (corresponding to an increase in the quantity of lead of 0.5 gram from the preset value), the count in the counters 143–144 is "99," giving a "one" signal on all of the inputs to gate 157. This provides a "zero" at 158, producing a "one" signal at the output 132 of gate 131, resulting in activation of the alarm system; thus, an alarm will be given when the up/down counters 133–134 have moved up 49 counts from their initial setting.

The "zero" signal at 158 (under the above conditions, that is, a "99" count in counters 43–44) is inverted through a signal inverter (OR gate) 159, giving a "one" signal, an Up Limit Signal, at the inverter output 160. This Up Limit Signal is applied as a "one" to a NAND gate 161 in the APD Board (FIG. 3), the other input to this gate being obtained from the output of amplifier 46. When counting "up," the signal at the output of amplifier 46 has a value of "one." Thus, when the count in counters 143–144 is 99 and an "up" count is called for, both signals applied to NAND gate 161 are "ones," resulting in a "zero" signal at the output 162 of gate 161.

The last-mentioned Down Limit CE Signal (on output lead 162) is fed to the APR Board of FIG. 4 and to the LB of FIG. 7. This signal, which is a "zero" when the count in counters 143–144 is 99 and an "up" count is being called for, is fed at 148 to the CE Terminal of counter 143 and at 149 to the CE Terminal of counter 144, both of these counters being in the LB of FIG. 7; it is also fed at 66 to the CE Terminal of counter 54, at 67 to the CE Terminal of counter 55, and at 68 to the CE Terminal of counter 56, these three last-mentioned counters being in the APR Board of FIG. 4. Thus, all five of the up/down decade counters are inhibited from changing the count in the direction (up) which caused the count of "99" to be reached by counters 143–144. When the count in counters 143–144 is "99" and a "down" count is being called for, a "one" signal is provided at 162, since the output of amplifier 46 (applied to the input of NAND gate 161) is then a "zero." This "one" signal does not produce any inhibiting action on the counters; therefore, all of the counters are permitted to count in the direction (down) opposite to the direction (up) which caused the "99" count to be reached in counters 143–144.

The fourth limiting arrangement, applicable to both butane and lead, activates the alarm at a preset maximum quantity (preset by means of manual switches behind the module, on the back board), and the unit is inhibited from going above this preset quantity, although it is permitted to step down from this amount.

Refer now to FIG. 8, which is a simplified circuit schematic of a Maximum Percentage Alarm (MPA) Circuit Board. A set of three manual (thumbwheel-type) "preset maximum limit" switches 164, 165, and 166, essentially similar to the "units" switch 58, the "tenths" switch 61, and the "hundredths" switch 64, respectively, of FIG. 4, are provided, these "maximum limit" switches preferably being mounted behind the module, on the back board. The switches 164-166 are supplied with input pulses from the master pulse generator 1 at 57, 60, and 63, respectively, in the same manner as are the switches 58, 61, and 64, previously described. The pulse outputs of the switches 164-166 (the number of pulses in such outputs being determined by the settings of the switches) are combined by means of a lead 167 (analogous to lead 80 of FIG. 4) and fed over a diode 168 and a Zener diode 169 to the base of a transistor 170 which comprises the active portion of a pulse shaping (pulse narrowing) circuit. The signal output (having the form of narrow pulses) is taken from the collector of transistor 170 and utilized as one of the inputs for a NAND gate 171, and also as one of the inputs for a NAND gate 172. The other input to gate 171 is obtained from the positive potential source, and thus is always a "one" or "high." The "set point" pulse output of gate 171 (the "maximum" set point being determined by the settings of switches 164-166) is fed as one input to a flip-flop circuit 173, and is also fed directly to a gating device 174 which provides one input for an "Exclusive OR" circuit 175, and is fed through a signal inverter 176 to a second gating device 177 which provides another input for the circuit 175.

Signal input for the MPA Circuit of FIG. 8 is obtained from the output of the entire ABC Unit 3, which appears on output lead 4 (FIG. 1). The pulses appearing on output lead 4 (as determined by the ABC action of unit 3, described previously) may be thought of as a "test signal," as contrasted to the "set point" signal previously referred to, which latter is determined by the settings of switches 164-166. This so-called "test signal" is fed over a diode 178 and a Zener diode 179 to the base of a transistor 180 which comprises the active portion of a pulse shaping (pulse narrowing) circuit. Narrow-pulse output is taken from the collector of transistor 180 and utilized as the other input for NAND gate 172, and also as one of the inputs for a NAND gate 181. The gate 172 in effect combines the "test signal" pulses and the "set point" pulses, providing at its output a continuous succession of pulses. This output is fed through a pair of cascaded one-shot multivibrators 182 and 183, to produce very narrow, delayed pulses which are fed through a signal inverter 184 to one input of an AND gate 185.

The other input to gate 181 is obtained from the positive potential source, and thus is always a "one" or "high." The "test signal" pulse output of gate 181 (i.e., the component percentage set point output of the ABC Unit) is fed as the other input to the flip-flop circuit 173, and is also fed directly to the gating device 177, and is fed through a signal inverter 186 to the gating device 174. The outputs of the gating devices 174 and 177 provide inputs to the "Exclusive OR" circuit 175, whose purpose is to prevent input pulses which occur simultaneously from producing any output. There is no output from circuit 175 when there are pulses on both its inputs simultaneously, but there is an output from this circuit when there is a pulse on only one input.

The output of circuit 175 is fed through a signal inverter 187 to the other input of AND gate 185. The AND gate 185, fed with signals by the circuitry previously described (including items 171, 172, 174-177, 181-184, 186, and 187) provides at its output a train of clock pulses, one for each "test signal" pulse and one for each "set point" pulse fed to the MPA Board. These clock pulses are fed as shift clocks from the output of gate 185 to two four-bit shift registers (integrated circuits) 188 and 189, which are interconnected as illustrated to provide an eight-bit left-right shift register. The register shifts left or right on each shift clock, shift direction being determined by the output of the flip-flop circuit 173, which is fed as a left shift/right shift select signal to the PE terminals of the shift registers 188 and 189, by way of a lead 190. The circuit 173 (fed by the "test signal" pulses and the "set point" pulses) provides signals to shift the registers 188-189 in one direction for each "test signal" pulse, and in the opposite direction for each "set point" pulse. Each element 188 and 189 shifts right when the PE is high and left when it is low. The shift registers are set up for left shift data out, by means of an output lead 191 connected to shift register 188. Lead 191 goes to an element 192 which is one element of a flip-flop circuit; the other element of the flip-flop is denoted by numeral 13. The flip-flop 192, 13, connected as illustrated, ensures that a full travel or shift of the register 188-189 will be required to go into or out of the alarm state; thus, alternating of the pulses at the input to the register will not put the unit into and out of alarm.

When the number of pulses in the ABC Unit output ("test signal" in FIG. 8) reaches the preset maximum quantity (the "maximum set point" in FIG. 8, preset by means of the maximum limit switches 164-166), the left shift in the register 188-189 is complete, giving a "maximum alarm" signal on lead 191 which has a "zero" value on lead 163.

This "maximum alarm" signal, which has a "zero" value under "maximum alarm" conditions, is fed by way of lead 163 as another one of the inputs to the NAND gate 131 in the Limit Board (FIG. 7). This "zero" signal at 163 produces a "one" signal at the output 132 of gate 131, resulting in activation of the alarm system; thus, an alarm will be given whenever the output (at lead 4) of the PS Board (FIG. 5) exceeds the preset maximum (as preset by the manual maximum limit switches 164-166).

This "maximum alarm" signal ("zero" under alarm conditions) is also fed to OR gate 159, to provide an "up limit" signal of value "one" at output 160. This "up limit" signal is applied to gate 161 in the APD Board, as previously described. When the output of the PS Board exceeds the preset maximum, and an "up" count is called for, a "zero" signal appears at the output 162 of gate 161. This last-mentioned signal is fed as a "Down Limit CE" Signal to the APR Board of FIG. 4 and to the Limit Board of FIG. 7. This signal, which is a "zero" when the PS Board output exceeds the preset maximum, is fed to the CE terminals of counters 143 and 144 in the Limit Board, and to the CE terminals of counters 54-56 in the APR Board. Thus, all five of the up/down decade counters are inhibited from changing the count in the direction (up) which caused the preset maximum to be reached by the PS Board. When the PS Board output is at the preset maximum and a "down" count is being called for, a "one" signal is provided at 162, since the output of amplifier 46 is then a "zero." This "one" signal does not produce any inhibiting action on the counters; therefore, all of the counters are permitted to count in the direction (down) opposite to the direction (up) which caused the preset maximum to be reached by the PS Board output.

It has previously been stated, in connection with FIG. 1, that the ABC Unit of the invention may be used to control the proportion of lead in the blended stream, in order to affect the octane number of the blended liquid (blended gasoline stream). However, certain other blending components (e.g., certain hydrocarbons used for gasoline) have an effect on the octane number of the blended stream. It is within the scope of this invention to control the octane number of the blended stream by means of the aforementioned "other blending components." In order to do this, the output of the ABC Unit 3 would be utilized to control the proportions of these other blending components in the blended stream, the change in the component percentages (effected by the operation of the ABC Unit) being made in the manner necessary to correct the octane number of the blended stream.

The invention claimed is:

1. In an automatic system adapted to maintain the magnitude of a property of a blended liquid stream substantially constant, such property being affected by the percentage of one particular component in the blended stream: the combination of means for initially establishing an approximate percentage set point for said one component, an analyzer receptive of said blended stream for measuring a property thereof and for producing an output proportional to the magnitude of such property, means responsive to the analyzer output for automatically adjusting the component percentage set point, to thereby maintain said property magnitude substantially constant, means establishing a plurality of predetermined quantitative limits directly on said component percentage set point, and means automatically inhibiting further automatic adjustment of such set point in the direction which caused the limit to be reached, once any of these limits on such set point has been reached.

2. Combination of claim 1, including also means for activating an alarm upon the reaching of any one of the said predetermined limits by said component percentage set point, as the same is automatically adjusted.

3. In an automatic system adapted to maintain the value of a specific property of a blended liquid stream substantially constant, such specific property being affected mainly by the percentage of one particular liquid component in the blended stream and said system operating in response to an applied percentage set point for said one component: an arrangement for controlling the percentage set point for said one component comprising means for initially establishing an approximate component percentage set point, an analyzer receptive of said blended stream for measuring said specific property thereof and for producing an output electrical signal representative of the value of said specific property, means for comparing the analyzer output signal with an analyzer set point voltage and for developing signals of opposite senses in response to respective variations in opposite directions of said analyzer output signal with respect to said analyzer set point voltage, non-mechanical means for utilizing signals developed by said last-named means for automatically varying the component percentage set point either upwardly or downwardly, as determined by the sense of said developed signals, means establishing a plurality of predetermined quantitative limits directly on said component percentage set point, and means automatically inhibiting further automatic variation of such set point in the direction which caused the limit to be reached, once any of these limits on such set point has been reached.

4. Arrangement of claim 3, including also means for activating an alarm upon the reaching of any one of the said predetermined limits by said component percentage set point, as the same is automatically varied.

5. Arrangement set forth in claim 1, wherein the means for utilizing includes a plurality of gates arranged in a digital array and fed by pulses from a pulse generator, and means for supplying signals derived from said developed signals, and representative of the same, as control signals to said gates, thereby to control the number of pulses passing through such gates.

6. Arrangement set forth in claim 3, wherein the last-mentioned means inhibits variation of the component percentage set point downwardly from zero.

7. Arrangement set forth in claim 3, wherein the last-mentioned means inhibits variation of the component percentage set point upwardly above a preset maximum.

8. Arrangement set forth in claim 3, wherein the last-mentioned means inhibits variation of the component percentage set point beyond a preset limit, in either direction.

* * * * *